United States Patent [19]

Turner

[11] 4,276,721
[45] * Jul. 7, 1981

[54] METHOD AND DEVICE FOR CONTROL OF TRANSLOCATION IN A STEM

[76] Inventor: Henry H. Turner, 2702 Techwood Dr., Columbus, Ga. 31906

[*] Notice: The portion of the term of this patent subsequent to Mar. 18, 1997, has been disclaimed.

[21] Appl. No.: 88,518

[22] Filed: Oct. 26, 1979

Related U.S. Application Data

[63] Continuation-in-part of Ser. No. 1,188, Jan. 5, 1979, Pat. No. 4,193,224, which is a continuation of Ser. No. 745,324, Nov. 26, 1976, abandoned, which is a continuation of Ser. No. 610,771, Sep. 5, 1975, abandoned, which is a continuation-in-part of Ser. No. 429,392, Sep. 28, 1973, abandoned.

[51] Int. Cl.³ .............................................. A01G 1/00
[52] U.S. Cl. .......................................... 47/58; 47/1 R
[58] Field of Search .................. 47/1 R, 58, 42–43, 47/1.3

[56] References Cited

U.S. PATENT DOCUMENTS

| 270,226 | 1/1883 | Kimball | 47/58 |
| 740,740 | 10/1903 | Brown | 47/42 |
| 2,007,879 | 7/1935 | Sefton | 47/1.3 |
| 2,039,533 | 5/1936 | Hibbard | 47/42 X |
| 2,984,938 | 5/1961 | Crawford | 47/42 |
| 4,193,224 | 3/1980 | Turner | 47/1 R |

Primary Examiner—Robert E. Bagwill
Attorney, Agent, or Firm—Watson, Cole, Grindle & Watson

[57] ABSTRACT

A method and device are provided for control of translocation in a stem by restriction of growth, the stem being contained within an incomplete enclosure having at least one gap or break in its limits so that growth of the stem will be restricted at the limits of the incomplete enclosure and will extend through the gap. Thereafter growth may extend into a slot, to be restricted at the lateral limits of the slot. The incomplete enclosure may lie at one level or may extend beyond one level. An incomplete enclosure may be placed at each of a plurality of levels. Application of the method results in increased availability of carbohydrates above the site of application for incorporation into and enhancement of production of leaves, stems, flowers, fruit and seeds.

48 Claims, 28 Drawing Figures

METHOD AND DEVICE FOR CONTROL OF TRANSLOCATION IN A STEM

RELATED APPLICATIONS

This is a continuation-in-part of Application Ser. No. 1188, filed Jan. 5, 1979, and now U.S. Pat. No. 4,193,224, as a continuation of Ser. No. 745,324 (now abandoned) and filed Nov. 26, 1976, as a continuation of Ser. No. 610,771 (now abandoned) and filed Sept. 5, 1975, as a continuation-in-part of Ser. No. 429,392 (now abandoned) and filed Sept. 28, 1973.

BACKGROUND OF THE INVENTION

This invention relates generally to the translocation of metabolites in a growing stem and more particularly to a method and device for bringing about the effects of girdling by mechanical means.

Girdling is variously defined, the term referring generally to encircling a stem partially or completely by a cut, commonly through the bark, at times into the wood, to interrupt pathways for translocation of metabolites. Girdling techniques have been used for centuries. To induce earlier fruiting in a tree slow to produce, a grower may girdle the tree by removing a band of bark of a predetermined width from the entire circumference of the trunk. This is called ringing. A stem may be girdled completely around by one knife or saw cut through the bark to enhance the size and number of fruit. This is called scoring. Notching is a technique whereby bark in only a small portion of the circumference is interrupted, as above a bud, to induce growth by blocking suppressive hormones from the distal growing tip. These injuries heal generally in the course of one or two seasons. In clearing a forest, the woodsman may kill a tree by cutting deeply into the wood around the trunk.

The above techniques have in common the immediate development of insufficiency of media for translocation of metabolites by interruption of these pathways, generally in the phloem, sometime in the wood.

Carbon dioxide and water are combined by photosynthesis in the green leaves of a plant to form carbohydrates, the building material of roots, stems, flowers, leaves, fruits and seeds. Carbohydrates move from the leaves, through the bark generally downward toward the roots. Water and minerals absorbed by the roots move generally upward through the wood, deep to the bark, toward the leafy extremities, with the more superficial layers of wood carrying a disproportionately larger amount of water and minerals than the deeper layers. In a stem of a growing plant, new wood is formed deep to the cambium, superficial to other wood already formed, the cambium with overlying bark being thrust thereby outwardly, or centrifugally. New bark is formed superficial to the cambium. The radius and circumference of the stem increase concomitantly, so that growth may be resolved into two components, radial and circumferential. A strong band closely encircling a growing stem will oppose these components and the bark, while being compressed against the inner surface of such a band by the underlying growth, will be progressively compressed and translocation through it impeded. No new wood will be formed beneath the band. Translocation in the superficial wood already present will decrease with age. Strangulation will ultimately ensue. Encircling bands and rings of wire have been applied to stems in attempts at enhancing formation of pollen and flowers, with some degree of success. Related experimentation has included girdling, with removal of a completely encircling strip of bark at one level, with semicircular girdling cut at each of two levels, with a spiral gridling cut extending beyond one level and occupying all sectors about the stem axis, and girdling cuts at one level occupying more than 180° about the axis of the related stem. The method of this invention allows for accomplishing the ends of these prior methods with minimal if any bark injury, with no exposure of wood to dessication and invasion, and for the elective use of a slot for containment of growth, advantages not attainable with the other methods. A girdling cut is frequently overgrown in two or three seasons. Such has not been observed so far in the application of this method. With the arrangements most widely used it is physically impossible. The method thus provides an elective permanency of effect contingent on the lengths of applied slots.

SUMMARY OF THE INVENTION

In accordance with one aspect of the invention, a growing stem is confined within an incomplete enclosure formed by a linear segment of material extending about the stem so as to occupy a major portion of the sectors about the stem axis. The enclosure is incomplete by virtue of there being a gap in its limits. Growth of the stem fills the incomplete enclosure and is restricted by the containing linear segment but extends without interruption between the levels above and the levels below the site of restriction. After extension through the gap, growth may be further confined to a slot, limited laterally by linear segments, with continued control of translocation. Neither incomplete enclosure, gap, nor slot need be confined to a position at right angles to the stem axis (one level), but may extend beyond such a position with advantage.

In accordance with another feature of the invention, control for translocation in a stem is effected by containing the stem within more than one incomplete enclosure, each at a separate level, each such enclosure being incomplete by having at least one gap or break in its limits and each enclosure being limited by at least one linear segment of material impervious to growth and resistant to the pressure of growth and maintained about the stem in a position transverse to channels for translocation. A linear segment limiting an incomplete enclosure at one level may lie in the same sector of the stem as a gap at another level.

A linear segment is a strip, strand, rim, border, or margin or that portion of a piece of material presenting at least a narrow surface toward a growing stem. It may be rectilinear or curvilinear. It is more than a line in a purely mathematical sense, since a line in that sense has length as its only dimension.

The face of a wire presented toward a stem around which the wire is wrapped is a linear segment. The portion of the edge of a plate, between the two major surfaces, that faces a stem is a linear segment. Such a linear segment is impervious to growth (i.e., growth will not traverse limits set by a linear segment). It is resistant to the pressure of growth. In plate-like material, it is maintained by the resistance of the plate to change in shape. As a flexible strand of considerable tensile strength it is used with fixed extremities and restricts growth after any slack has been taken up.

It is the principle object of this invention to impede translocation in a stem by confining the stem within an incomplete enclosure limited by a linear segment restricting growth in at least a major portion of the segments about the stem axis, with preservation of continuity of growing tissue between that portion of the stem above the site of restriction and that portion below, to avoid strangulation which would ultimately ensue were there no continuity. Continuity of growing tissue occurs by virtue of a gap in the limits of the incomplete enclosure. After extension through a gap, growth may be further restricted by containment within a slot allowing free radial growth but restricting circumferential growth according to an elected pattern determined by the position and contours of the lateral limits of the slot. Neither incomplete enclosure, nor gap, nor slot need be confined to 'one level'. Functional advantage may accrue to departure from one level. The linear segment may be a flexible strand of considerable tensile strength, fixed in varying fashion at the surface of the stem.

It has been repeatedly observed that, once growth has filled an incomplete enclosure, no new wood is formed at the limits of the enclosure, all new wood being formed in the gap or gaps related to the incomplete enclosure and in any related slot. In other words, application of this method restricts growth of new wood to selected sectors about the axis of the stem, with absolute cessation of growth in other sectors.

A still further object of this invention is to provide such a control device and technique wherein various arrangements of linear segments are made possible such as, subtending less than 360° about the axis of the stem and having one gap for growth in the limits of the enclosure, a plurality of linear segments each subtending not more than 180° with a corresponding number of slots, both of the above lying at a selected level or extending beyond one level, an incomplete enclosure at a plurality of levels each limited by a linear segment subtending more than 180°, etc.

The method allows for the imposition of barriers to translocation both in bark and in the wood itself. The locus of restriction may electively be in only a small sector or in all sectors about a stem axis. Translocation may be forced to any desired sector or combination of sectors. All metabolites in transit past a site of application may be forced into cross-channel movement. Benefits from application of the method derive from the greater than usual accumulation of carbohydrates above the site of application with resultant availability for incorporation into the metabolic processes of the stem, including production of leaves, stems, flowers, fruit and seeds.

Further objects, advantages and novel features of the invention will become more apparent from the following detailed description of the invention when taken in conjunction with the accompanying drawings.

DETAILED DESCRIPTION OF THE INVENTION

Figure 1:
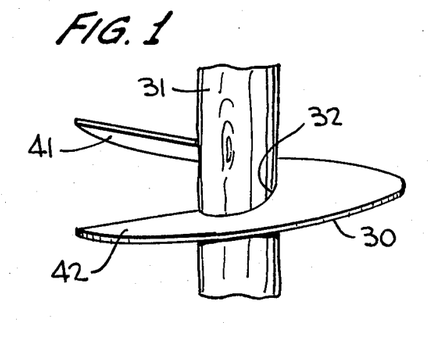
FIG. 1 is a side elevation of a disc-shaped plate mounted on a stem and including a linear segment extending beyond one level.
Figure 2:
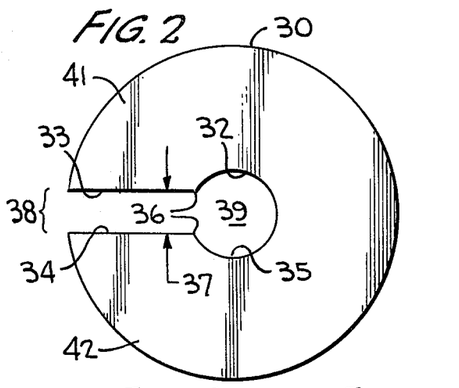
FIG. 2 is a top plan view of the plate of FIG. 1.

Turning now to the drawings wherein like reference characters refer to like and corresponding parts throughout the several views, FIGS. 1 and 2 show a disc-shaped plate 30 mounted on a growing stem 31 of a tree or plant not otherwise shown, the stem being vertical as shown or horizontal. The plate has an eccentric opening 32 and side edges 33 and 34 extending therefrom. The curvilinear margin of material 35 delimiting opening 32 is impervious to growth and is continuous with side edges 33 and 34, also impervious to growth. Juncture points between the side edges and margin 35 are indicated at 36, these points defining the limits of a gap 37 through which opening 32 is continuous with a slot 38 defined by the side edges. Edge 35 and edges 33, 34 delineate the site of effectiveness of this device as shown, a linear continuum impervious to growth and maintained in position against the pressure of growth by the surrounding plate-like material. Plate 30 is essentially the same as the disc-shaped plate shown in FIG. 6 of parent Application Ser. No. 1188, now U.S. Pat. No. 4,193,224. However, the curvilinear segment 35 of material, which subtends less than 360 degrees above the axis of the stem and which delimits an incomplete enclosure 39, closely contains the stem and extends beyond one level. Legs 41, 42 of the plate, which contain respective side edges 33 and 34 are splayed, or spread apart, so as to lie in different planes shown in FIG. 1 relative to the stem to thereby induce a helical margin 35 relative to the stem. It should be pointed out that plate 30 may be of any suitable strong material such as plastic or metal. The eccentric position of the opening 32 places the center of gravity in slot 38 below a supporting horizontal limb, so that plate 30 will not fall once in position. Such a plate may be placed over a growing stem without additional fixation, and may be similarly placed over a vertical stem near the ground base or in any other suitable displacement. Growth, after filling opening 32, will be confined to slot 38. It is to be noted that edges 33, 34, and 35 are the prime functional elements of plate 30, and that the disc-shape is merely a convenience. The structure could be rectangular or octagonal and function as well.

Initial restriction of growth is effected by the rim or segments of material 35 about opening 32 of the plate, as growth approaches and contacts this rim. Growth thereafter extends through the gap 37 into slot 38 and thereafter edges 33 and 34 are effective in restricting growth. The restrictive action of plate 30 thus occurs in two stages—one due to the linear segment forming the incompletely closed limits of opening 32, and one due to the linear segments constituting side edges 33 and 34 of slot 38. Plate 30 may thus be considered as two devices, conjoined—one providing an opening 32 with a gap 37 opening to the outside, and one providing a growth channel 38 leading away from this gap.

Extension beyond one level (FIG. 1) by plate 30 containing opening 39 continues through gap 37 with slot 38, is shown in FIG. 2. The device is splayed, so that neither rim 35, nor slot 38 will lie in one plane. This splaying provides for gap and slot of elective width, and, since splaying is in a direction parallel to the axis of a contained stem, the gap and slot may be varied without a similar degree of variation in the portion in the sectors contained within rim 35.

Figure 3:
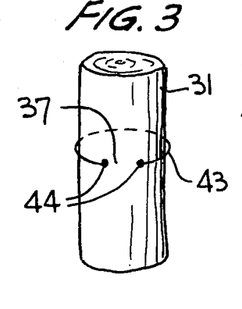
FIGS. 3–16 are schematic side elevational views of various arrangements of linear segments each mounted on a stem.

FIG. 3 shows at one level an analog of the incomplete enclosure of FIG. 2 limited by linear segment 35 and having a gap 37 for growth in the limits of the incomplete enclosure. This is in the form of a strip or strand 43 of wire of adequate tensile strength to resist the pressure of growth and extending at the surface of the stem at one level between two points 44 of fixation. These points or extremities of the flexible wire 43 may be fixed to stem 31 by nails (not shown) defining gap 37 therebetween. The nails extending radially outward from the stem provide a slot 38 continuous through the gap with the incomplete enclosure delimited by the wire 43.

Figure 4:
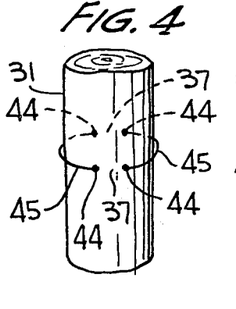

FIG. 4 depicts an incomplete enclosure at one level and formed by two linear segments in the form of flexible wires 45 each occupying less than 180 degrees about the axis of stem 31. Two gaps 37 are formed between adjacent terminal ends 44 fixed by nails similarly as in 33. Extension of these nails radially will provide slots.

Figure 5:
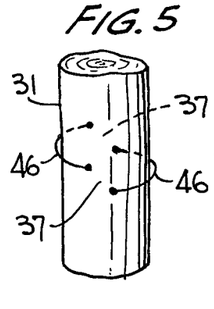

FIG. 5 demonstrates an arrangement of two linear segments in the form of flexible wires 46, at different levels, each subtending less than 180 degrees and forming an incomplete enclosure extending beyond one level. Each gap 37 allows for uninterrupted translocation parallel to the stem axis and for cross-channel translocation. The terminal ends may be fixed by nails or the like extending outwardly from the stem, thereby defining slots for growth for containment after growth has extended through the gaps.

Figure 6:
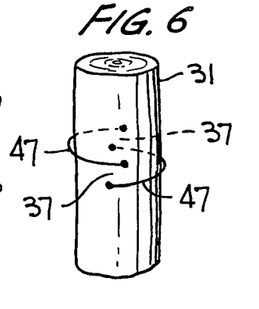

The incomplete enclosure of FIG. 6 is similar to that of FIG. 5 except that each linear segment is in the form of a flexible wire extending beyond 180 degrees, thereby allowing for no uninterrupted longitudinal translocation but allowing for cross-channel translocation through slots 37.

Figure 7:
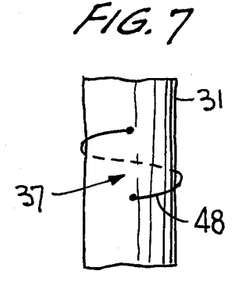

FIG. 7 discloses an incomplete enclosure formed by a strand 48 extending 360° about stem 31 but also extending beyond one level, allowing for a gap 37 permitting cross-channel translocation but not uninterrupted longitudinal translocation. Translocation is blocked in all sectors of the stem, gap 37 lying between the extremities of the wire, allowing for continuity of growth and cross-channel translocation between the levels above and below the site of restriction.

Figure 8:
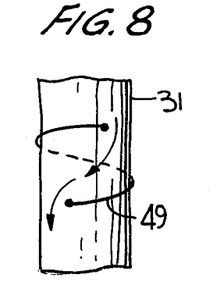

FIG. 8 shows an incomplete enclosure formed by a strand 49 extending beyond (greater than) 360° and beyond one level. Gap 37 extends between the extremities of the wire allowing for continuity of growth and cross-channel translocation, as depicted by the arrow, between the levels above and below the site of restriction similarly as in FIG. 7.

Figure 9:
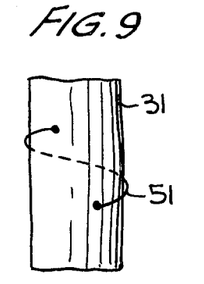

FIG. 9 shows an incomplete enclosure formed by a strand 51 occupying less than 360° and extending beyond one level. Such an arrangement allows for both longitudinal and cross-channel translocation.

Figure 10:
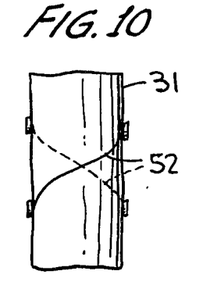

FIG. 10 shows a pair of strands 52 together occupying 360° of the stem, with each strand extending beyond one level. In this particular arrangement, each strand occupies 180°. The elective limits of gaps 37 are defined by the extremities of the wires. This arrangement does not allow for uninterrupted longitudinal translocation with there being a cross-channel component to all movement past the site of application.

Figure 11:
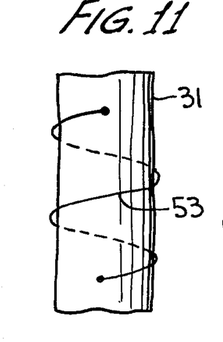

The FIG. 11 mounting shows a spiral or helicoid strand 53 arrangement, occupying or covering two complete turns, or 720°. A gap as herein described does not exist here, as the shortest distance at the surface of the stem between the extremities of the strand is occupied by the mid portion of the strand. The "shortest distance" between the extremities is not "free of material". This pertains at and beyond (greater than) 540°. By this very token, the enclosure of FIG. 11 does not fall within the meaning of the term "incomplete enclosure", as herein used, as the strand subtends 540° or more. By definition, an incomplete enclosure, as the term is herein used, formed by one linear segment, never has a gap of 180° (one and a half turns) or more. A cross-channel movement obviously is required for translocation past this mounting.

Figure 12:
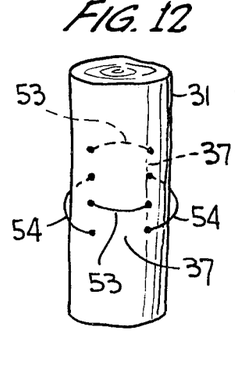

FIG. 12 shows an arrangement of two incomplete enclosures at different levels. The incomplete enclosures are respectively formed by strands 53 and strands 54, each strand occupying less than 180°. Sectorially in line with a gap 37, with each such gap, or with any gap at a level, at each level, or at any level is a linear segment at another level, at least partially interrupting longitudinal translocation through the gap.

Figure 13:
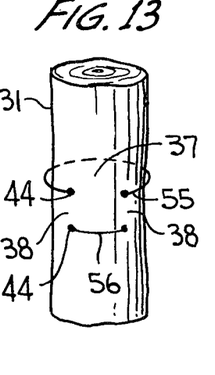
Figure 14:
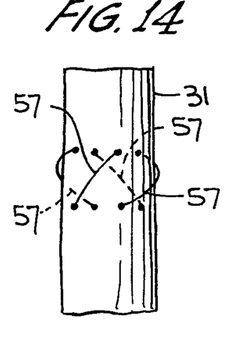

FIG. 13 depicts an incomplete enclosure formed by a strand 55 subtending less than 360° and being similar to that of strand 43. A linear segment in the form of strand 56 is mounted at another level longitudinally in line with gap 37 of the incomplete enclosure formed by strand 55 restricting growth and translocation in the sector of this gap. Gap 37 formed between points 44 of attachment for the extremities of the strands, extends beyond one level. The FIG. 14 arrangement shows four strands 57, each less than 180° and extending beyond one level.

Figures 15, 16:
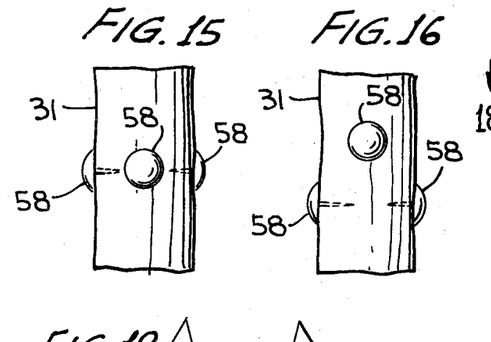

FIG. 15 shows four circular linear segments, each comprised of the rim of a disc 58 lying flat against the stem surface, and forming an incomplete enclosure extending beyond one level.

FIG. 16 is similar to FIG. 15 but showing alternate discs 58 at separate levels, or two incomplete enclosures at separate levels, overlapping, or one incomplete enclosure formed by four circular segments, or an incomplete enclosure with undulating limits, etc.

With each general modification shown in the aforedescribed FIGS. 3 to 16, the variety of accomodations increases geometrically, so that description here becomes lengthy, if not unending. There is, however, a relatively simple theme extending through what has been and still is at times a bewildering array of relationships. This may be expressed as an arrangement of linear segments forming a narrow pass between two levels, impeding translocation between the two levels both in bark and in new wood, or in bark or new wood, the pass preserving continuity of growing tissue between levels above and levels below the site of application of the method.

Limits for various angles subtended as in the various disclosed embodiments are not selected arbitrarily, but are on a basis of function and structure. A linear segment subtending not more than 180° (one-half turn) about a stem cannot form an incomplete enclosure, as there is no enclosure. Three points are required for an enclosure, and these points must be so distributed topographically that the distance separating them is less than the measurement of an object enclosed. A gap free of material may exist for an incomplete enclosure limited by one linear segment up to but not including 540° (one and one-half turns), but at 540° there is no "shortest distance", but two of equal distances, one free of material and one intersecting the linear segment in its turn about the stem. Beyond 540°, all shortest distances intercept the linear segment. Thus, an incomplete enclosure, as the term is herein used, refers only to an arrangement in which no linear segment subtends 540° (one and a half turns) or more about the axis of a related stem. Expressed otherwise, an enclosure formed by a linear segment subtending 540° (one and a half turns) or more about the axis of the related stem does not conform to the meaning of the term "incomplete enclosure", as herein used. A recurrent helix has been mounted on a stem and will work effectively. It has the disadvantage of requiring more time and material. Of interest, with reference to helices, is the observation that with increasing distances between turns, a heavier strand is required to resist growth pressure, as a final integration of forces creating tension in a strand so mounted is based on a summation of vectors in a half-turn parallel to a radius extending to the mid-point of the half-turn. Increasing the distance between turns increases the surface area subjected to the pressure of growth. Further, increasing the distance between turns decreases the degree of impediment to translocation as was observed on a sweet gum stem restricted by three linear segments, each less than a half-turn mounted in a helicoid or spiral fashion. The gaps were relatively wide, allowing cross-channel translocation to occur relatively freely, so that the wood was not built up appreciably above the level of restriction. Linear segments making less than a full turn in a spiral fashion about a stem have been observed frequently in practice and have been effective in enhancement of peach production. Departure from one level and a helicoid positioning is inherent in the practical application of this method. Under field conditions, it is not possible regularly to achieve perpendicular or even one level arrangements, boring holes about an irregular stem, squatted on the ground, estimating angles and levels by eye. Only one line through a point on a surface of a stem in a family of an infinite number of lines lies in a plane perpendicular to the axis at that point. The thickness of the plate or wire or string demands departure from one level. Adequate flexibility allows this method to transcend strict adherence to mathematical precision. Helicoid or spiral positioning and departures from one level have been present and recognized since the original use of the method of this invention.

Figures 18, 19:
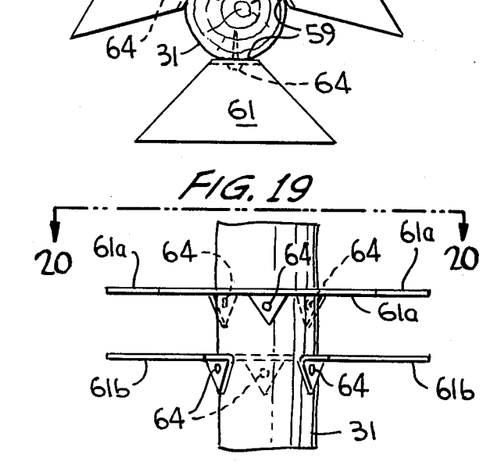
FIG. 18 is a top plan view of the plates of FIG. 17 taken along line 18—18 thereof.
FIG. 19 is a side elevational view of an incomplete enclosure at each of two levels, each formed by three truncated triangular plates affixed to a stem.
Figure 18A:
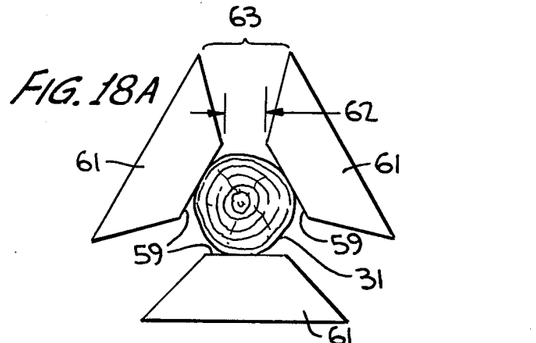
FIG. 18A is a similar view of FIG. 20 except that only the upper incomplete enclosure is shown for clarity.

The effectiveness of linear segments of the type shown in FIG. 18A has been demonstrated by experiment wherein such segments were placed in groups of three or four to form one level incomplete enclosures about stems of peach trees. On each of five trees, three such linear segments, defined by edges 59 of truncated plates 61 were mounted at 120° intervals about the axis of the trunk. On each of five trees four such linear segments were similarly mounted at 90° intervals and, on each of two Y-shaped trees, three such linear segments were so mounted on one of two equal limbs. (These truncated plates are the same as that shown in FIG. 3 of the aforementioned parent Application Ser. No. 1188, as arranged in FIG. 7 theeof.) In each of these applications, the stem affected was confined within an incomplete enclosure (FIG. 18A) limited by three or four linear segments 59 separated by a corresponding number of gaps 62 through each of which the associated enclosure was continuous with a slot 63. The average peach count (number of peaches) for the three-plated trees was 3.2 times greater than for control trees, and the average pounds picked (total weight of peaches) was 2.1 times greater. The average peach count for four-plated trees was 5.5 times greater and the average pounds picked, 3.7 times greater. The average values for peach count, pounds picked and peach weight were all greater for the plated limbs of the Y-shaped trees than for the unplated.

These results were not dependent alone on the slots described above. It was determined that a major factor in effectiveness of the method was the restriction of growth at the limits of the incomplete enclosure. Without slots, however, growth would, after extending through the gaps, approach a free logarithmic or geometric rate, allowing the stem to approach its prerestricted status.

Further evidence for effectiveness of incomplete enclosures alone, without significant effect from slots, was obtained when each of two trees were plated with four plates and each of four trees were plated with three plates, similarly arranged as drawn in FIG. 18A, prior to spring building. Approximately four months later, with insufficient time for growth to extend well into the slots, the trees were picked. The average plated tree had 1.96 times as many peaches as the average control, and 1.82 times greater pounds picked. It can be thus seen that confining a growing stem within an incomplete enclosure, limited by a plurality of linear segments and having a corresponding number of gaps in its limits, has been effective in enhancing peach production within four months of being positioned about a stem.

Stated otherwise, 62 linear segments individually, and 18 incomplete enclosures, each made up of a plurality of linear segments, have been shown to be effective in restricting growth to control translocation enhancing peach production.

The method of this invention allows for variation from the devices shown. The linear segments forming the enclosures are rectilinear, as they are, in these devices, lines of truncation made straight for convenience. They may be made curved for convenience. Truncation could and has been done along a curved line so as more closely to approach the contours of the surface of the stem, as shown in FIGS. 1 and 2. The linear segments forming the limits of an enclosure of the type shown in FIG. 18A could and have been made of a strand or filament of material with adequate tensile strength to resist pressure of growth maintained at the surface of a stem, with pressure of growth resisted by the tension of the strand, with economy and simplicity in production and a rapid onset of restriction of growth.

Figure 17:
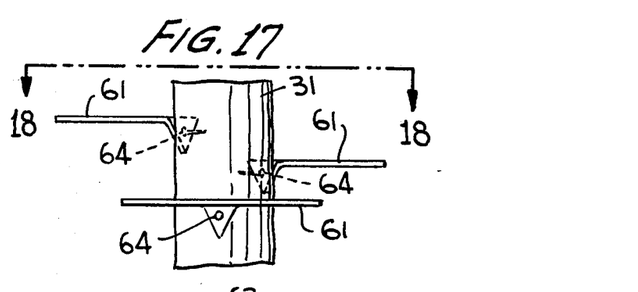
FIG. 17 is a side elevation of truncated triangular plates affixed to a stem with the sites of fixation positioned in a helical fashion.

Referring to FIGS. 17 and 18, at each of three levels on a sweet gum tree at intervals of 1½ inches, a truncated triangular plate 61 was mounted with points 64 of fixation dispersed along a helical course at 120° intervals about stem 31. Thus, an incomplete enclosure beyond one level was formed by the lines or edges 59 of truncation of the plates. In this arrangement, each of two gaps subtend 1½ inches along the axis of the stem, while a third gap subtends 3 inches. The stem grew for five years, with the plates restricting growth. This procedure shows: the maintenance of one linear segment subtending less than 180° at each of a plurality of levels, the formation of an incomplete enclosure extending beyond one level, linear segments fixed along a helical course limiting an incomplete enclosure, gaps lying along a helical course, and gap and slots extending beyond one level.

Figure 20:
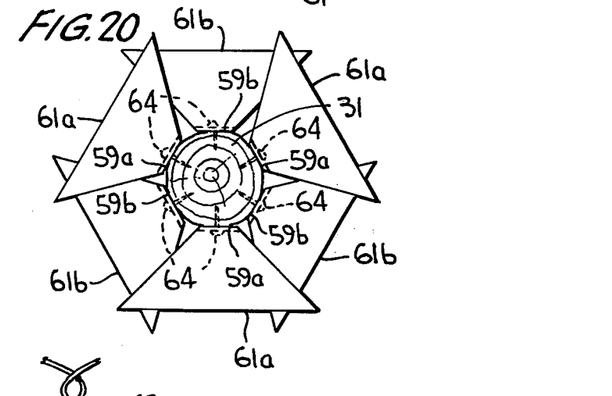
FIG. 20 is a top plan view of the plates of FIG. 19 taken along line 20—20 thereof.

FIGS. 19 and 20 show an incomplete enclosure at each of two levels, each formed by three truncated triangular plates 61a and 61b. The enclosures are out of phases, in that the linear segments (edges 59a) forming the incomplete enclosure at the upper level lie in the same sectors as the gaps at the lower level. The linear segments of the enclosure at one level are therefore directly above or below the gaps of the enclosure at the other level. Thus, the enclosure at one level is 60° out of phase with the enclosure at the other level. Stems so plated were shown to bear more heavily than other stems of the same plant. This procedure demonstrates: the maintenance of an incomplete enclosure at each of a plurality of levels on a stem; the mounting of a linear segment at one level transverse to pathways traversing a gap and/or slot at another level; and the positioning of an incomplete enclosure at one level out of phase with an incompleete enclosure at another level.

The following is a clarification of the terms commonly used throughout the specification.

A linear segment is a narrow strip of material impervious to growth and resistant to the pressure of growth to be maintained at the surface of a growing stem transverse to channels for translocation for restriction of growth.

An incomplete enclosure is a space for containing closely and restricting growth of a stem, whose limits are formed by material impervious to growth and resistant to the pressure of growth, generally arranged as one or more linear segments, the enclosure being incomplete by virtue of there being at least one gap or break in the continuity of its limits for extension of growth.

A gap is a hiatus or break in the continuity of the limits of an incomplete enclosure for extension of growth, lying between two points on the surface of the material limiting the incomplete enclosure, each of the points being generally at an extremity of a linear segment, the gap lying along the shortest distance between the two points along the surface of a stem at the limits of the incomplete enclosure and being free of material and too narrow to allow passage of the stem by translatory movement perpendicular to the axis of the stem.

A slot is a space with which an incomplete enclosure is continuous through a gap, limited on each side by a linear segment.

Channels for translocation are those pathways generally parallel to the axis of a stem and the grain of wood and bark along which longitudinal movement of metabolites (including water) occurs.

Cross-channel translocation is movement of metabolites, including water, in a direction having a component at right angles to the grain of wood and bark.

Figure 21:
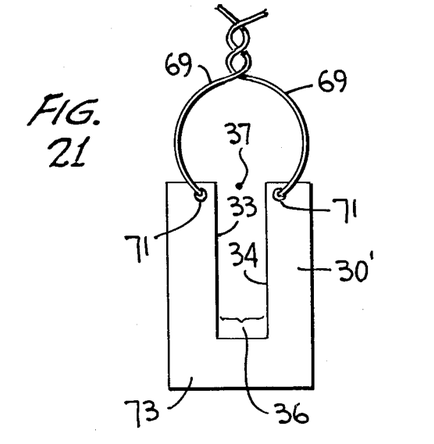
FIGS. 21 and 22 are top plan views of growth control devices according to the invention.

The device of FIG. 21 shows a gradation from plate 30 of FIG. 2 to a rectangular plate 30' with a slot 38 with wires 69 attached as at 71 near the extremities of gap 37. The wires are ultimately bent around a contained stem and twisted.

Figure 22:
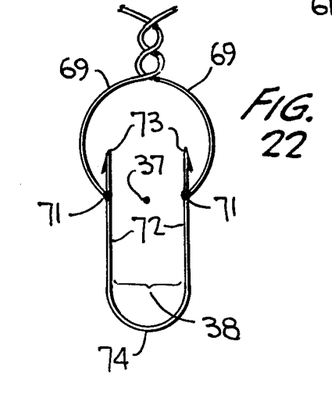

Another gradation of plate 39 is shown in FIG. 22 as a device including a pair of posts 72 to be driven into a stem to the depth of points 73, with strands 69 of wire connecting the posts as at 71 to form an incomplete enclosure. Connecting means such as 73 and 74 are provided electively for the extremities of the legs of plate 80' and of posts 72, for stability. The posts 72 may be mounted independently, without yoking.

Figures 23, 24:
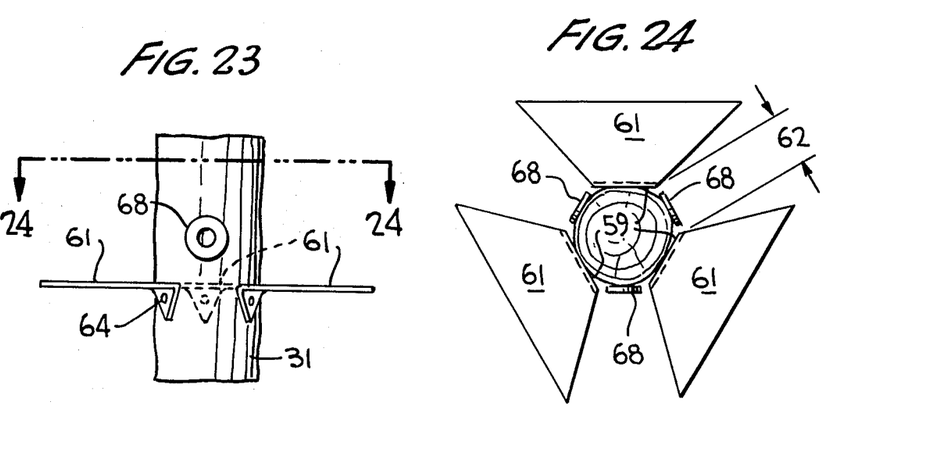
FIG. 23 is a side elevation of an incomplete enclosure at one level, formed by three truncated triangular plates affixed to a stem with washers affixed to the stem at another level at the gaps of the incomplete enclosure.
FIG. 24 is a plan view of the device of FIG. 23 taken along line 27—27 thereof.

Referring to FIGS. 23 and 24, three truncated triangular plates 61 were mounted on a pecan tree to form an incomplete enclosure, the limits being rectilinear segments 59 formed by bending the apices of the plates. At the time of mounting, these linear segments were each tangent to the stem at one point, and separated at other points by the curvature of the surface of the stem. To increase the rate of growth of the stem underlying these segments so as to hasten contact between the bark and the linear segments, large metal washers 68, providing circular linear segments, were mounted flat against the stem above each gap 62 so as to block translocation through the gap, forcing the growth to occur more rapidly beneath each linear segment limiting the incomplete enclosure. The three linear segments formed by these washers constitute the limits of an incomplete enclosure. After contact between the bark and the linear segments of the original closure had extended considerably along the linear segments from the original point of tangency, screws 64 were taken out, the washers removed and, to prevent dessication and disease, the screws put back into the boring. A temporary restriction of this sort for the same reason was made on a mimosa and a prunus stem at the same time. This procedure demonstrated maintenance of a linear segment transversely to a stem for an elective time span for a specific purpose, and maintenance of an incomplete enclosure about a stem for a limited time span for a specific purpose.

Figures 25, 26, 27:
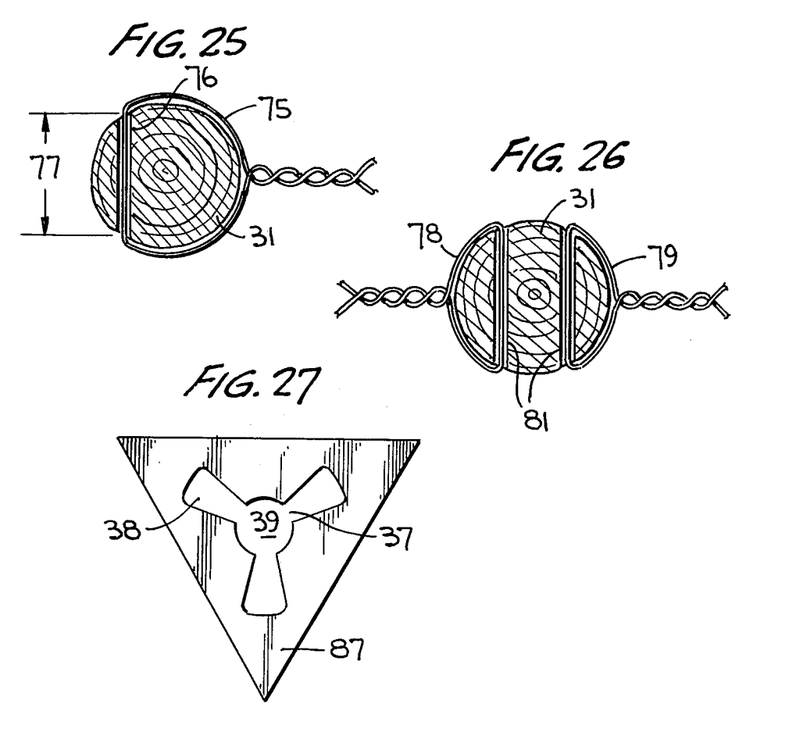
FIGS. 25 and 26 are plan views of incomplete enclosures formed by flexible strands passed through channels deep to the surface of a stem.
FIG. 27 is a top plan view of a device with central incomplete enclosure and a plurality of gaps, each gap leading into a slot with centrifugally divergent lateral limits.

FIG. 25 demonstrates fixation of the extremities of a flexible strand 75 forming an incomplete enclosure by passing the strand through a channel 76 provided beneath the surface of stem 31. Cambium in the gap 77 makes new wood and bark. The wood contained within the loop formed by the strand continues to function, so that translocation in an apical direction is not impeded early. Ultimately all significant translocation will cease within the loop.

In FIG. 26, an incomplete enclosure is shown formed by two flexible strands 79 each subtending less than 180° and fixed by passage through channels 81.

FIG. 27 shows another arrangement of incomplete enclosure, gaps, and slots, as in FIG. 18A and FIG. 2. The slots 38 are bridged by the yoke 87, corresponding to 73 in FIG. 21 and to 74 in FIG. 22. Incomplete enclosure 39 is continuous with slots 38 through gaps 37. This three-slot functional arrangement is surrounded by sheet metal, conveniently cut into a triangular shape. This is seen to be the device of FIG. 2 confined to one level and with three gaps and slots instead of one. It is the same as FIG. 18A with slots yoked. It corresponds to the device of FIG. 4A of parent Application Serial No. 1188, with apices 31 truncated and three instead of four slots, the slot sides being divergent. It offers the advantage of allowing for growth of new wood in three sectors about a stem axis, presenting a radially symmetrical structure at the level of restriction, corresponding to stays on a ship's mast, resistant to horizontal forces. This advantage, of course, accrues to other similar arrangements with more than two slots. Slots with sides divergent in a centrifugal direction allow for an increase in functional bark and new wood to accommodate an enlarging plant.

An ideal growing stem is an approximation to a right circular cone, whose volume is equal to ⅓ the area of the base times the altitude ($V = \frac{1}{3} \times \pi d^2/4 \times h$ where d equals diameter, h equals altitude). The mass of a material of uniform density contained by any solid shape equals the volume times the density of the contained material ($M = V \times D$), density being mass per unit volume. Thus the mass contained by a right circular cone equals ⅓ of the area of the base times the altitude times the density of the contained material ($M = V \times D = \frac{1}{3} \times \pi d^2/4 \times h \times D$). The main stem of a potted young rubber plant was contained within the central opening of a device of the nature of FIG. 30, with parallel slot sides. A control rubber plant grew in an identical pot. The diameters of the stem bases and the heights of the plants were determined at the time of mounting the device and after two growing seasons. The table immediately below shows each value plus the mass related thereto.

TABLE I

| | RUBBER | | | | | |
|---|---|---|---|---|---|---|
| | Planted Tree | | | Control Tree | | |
| | Diameter | Height | Mass | Diameter | Height | Mass |
| At Time of Planting | 1.5 | 42.5 | 25.04D | 1.4 | 40 | 20.5D |
| After Two Years | 2.4 | 100. | 150.8D | 2.1 | 85 | 98.1D |
| Percentage Increase | 60 | 135.3 | 502.3D | 50 | 112.5 | 378.0D |

A comparison of the ratios of the respective parameters at the time of plating and after two seasons' growth follows:

TABLE II

| | RUBBER | | |
|---|---|---|---|
| | Diameter | Height | Mass |
| Percentage Increase Plated / Percentage Increase Control | $\frac{60}{50} = 1.2$ | $\frac{135.2}{112.5} = 1.2$ | $\frac{502.3}{378.1} = 1.328$ |

The above table shows that the percentage increase in the parameters was appreciably greater for the plated than for the control tree.

The volume of a right circular cylinder equals the cross-sectional area times the height ($V = \pi d^2/4 \times h$). The mass contained by such a structure is equal to the volume times the density ($M = V \times D = \pi d^2/4 \times h \times D$). A short segment of a stem may for practical purposes be considered an approximation to a right circular cylinder. The stem of a young maple tree growing in the ground was contained within the central opening of a device of the nature of FIG. 1 (as in FIG. 6 of parent Application Ser. No. 1188, extending beyond one level), with three slots. A control maple tree grew 9½ feet away. The only detected difference between the two trees was a minimally greater height and one small side limb on the plated tree at 36 inches. After two seasons of growth, the plated tree had a height of 10'8", the control 10'2". Diameters were measured on each tree at levels 6 inches, 35 inches, and 72 inches above the ground. The 72 inch measurement on the plated tree included the main stem and the smaller lateral branch. The table below shows the results of the measurements, the mass of wood per unit length of stem at each level, and the ratio of the mass of wood on the plated tree to the mass of wood on the control at each level.

| | PLATED MAPLE | | CONTROL MAPLE | | Plated |
| --- | --- | --- | --- | --- | --- |
| Height of Measurement | Diameter | Mass per Unit Length | Diameter | Mass per Unit Length | Unit Mass Control Unit Mass |
| 6" | 1.53 | 1.84D | 1.19 | 1.18D | 1.66 |
| 35" | 1.183 | 1.107D | 0.84 | 0.56D | 1.98 |
| 72" | 0.5625 0.4685 | 0.4211D | 0.59 | 0.28D | 1.52 |

In this experiment, assuming equal density of wood in the two trees, the mass of the plated tree is seen to be at least 1½ times, or 50% greater than, the mass of the control at each of the levels, and nearly twice as great at one level in the midsection of the tree. Possibly playing a small part in the result was a truly marginally greater size of the plated tree at the onset, and marginally more sunlight. These disparities were felt to be minimal and insufficient to account for the differences as observed.

Two magnolia seedlings were dug up in one area and replanted 4½ feet apart at an experimental site (in a large dog pen). On one (minimally larger) a plate of the type of FIG. 30 with parallel slot sides was mounted just below the root-stem junction. After two seasons' growth, the trees were measured at ground level and at 2 inches above ground level (to avoid the enlargement encountered in every instance of tight containment since the first use of this method). Height of stem was measured and leaves counted, the leaves being attached at nodes and occurring serially in spiral fashion about the stem. The data are shown below with relative masses of wood, the latter determined by utilizing the formula for mass within the limits of a right circular cone, $M = V \times D = \pi d^2/4 \times h \times D$.

| | PLATED MAGNOLIA | CONTROL MAGNOLIA | Plated Control |
| --- | --- | --- | --- |
| Height | 23.5 | 12.25 | 1.9 |
| Ground Diameter | 51/64 | ⅝ | 1.275 |
| Diameter @ 2" | 9/16 | ½ | 1.125 |
| Mass of Wood | 1.95D | .80D | 2.43 |

After two season the mass in the plated tree is seen to exceed the mass in the control by a factor of 2.43. The above data strongly support the inductance of an increase in the rate of increase of mass of wood by this method, beyond what would occur under the usual circumstances of growth. Not only is it rational for this to occur, as the method provides a block to the movement of carbohydrates from those portions of a stem above the level of application, but a thickening of considerable degree has been observed routinely. Further support for an increase in the rate of wood formation is found in a comparison of internodal distances measured on the plated rubber, maple, and magnolia trees and their companion controls. In the case of the magnolia and rubber trees, average internodal distances from the base of the highest leaf were obtained. In each pair the internodal distances of the plated trees were greater than those of the controls.

| $C_{(1)}$ | $C_{(4)}$ | $C_{(0)}$ | $C_{(0)}$ | $C_{(1)}$ | $C_{(3)}$ | $C_{(0)}$ | $C_{(0)}$ | $C_{(0)}$ |
|---|---|---|---|---|---|---|---|---|
| $C_{(3)}$ | $P_{(4)}$ | $P_{(3)}$ | $C_{(5)}$ | $C_{(0)}$ | $P_{(2)}$ | $P_{(5)}$ | $P_{(1)}$ | $C_{(0)}$ |
| $C_{(6)}$ | $P_{(0)}$ | $P_{(10)}$ | $C_{(0)}$ | $C_{(0)}$ | $P_{(0)}$ | $P_{(4)}$ | $P_{(2)}$ | $C_{(2)}$ |
| $C_{(3)}$ | $C_{(3)}$ | $C_{(0)}$ | $C_{(0)}$ | $C_{(0)}$ | $P_{(10)}$ | $P_{(0)}$ | $P_{(0)}$ | $C_{(0)}$ |
|   |   |   |   | $C_{(1)}$ | $C_{(4)}$ | $C_{(0)}$ | $C_{(2)}$ | $C_{(0)}$ |

The smaller square above represents 16 trees in a nectarine planting at picking time in the second season of growth. Each of the bordering C's represents a control tree. Each of the four central P's represents a tree with growth restricted by a 3-slot triangular plate as in FIG. 30, the plate having been positioned in the first season of growth after the main stem had become large enough to fill opening 39. In parentheses, by each letter C or P, is seen a number which is the fruit count (number of nectarines) for the tree. The larger square represents in corresponding fashion 25 trees in a peach planting of the same age and same type and time of restriction, with 9 central trees plated and 16 peripheral control trees. No fruit occurred in either planting during the first season of growth.

|  | Number of Trees | Number of Trees Bearing | Percentage of Trees Bearing | Average Fruit Count per Tree | Average Fruit Count per Bearing Tree |
|---|---|---|---|---|---|
| Nectarine |  |  |  |  |  |
| Plated | 4 | 3 | 75 | 4.3 | 5.7 |
| Control | 12 | 7 | 58.3 | 2.1 | 3.6 |
| Peach |  |  |  |  |  |
| Plated | 9 | 6 | 67 | 2.7 | 4 |
| Control | 16 | 7 | 43 | 1 | 2.3 |
| Nectarine & Peach |  |  |  |  |  |
| Plated | 13 | 9 | 69.2 | 3.2 | 4.6 |
| Control | 28 | 14 | 50 | 1.5 | 2.9 |

The above table represents data based on fruit counts for the nectarine and peach trees, showing that the incidence of first bearing was higher among the trees restricted by the method of this invention than among controls, that the average yield for all trees with restricted growth was greater than that for controls, and that the average yield for bearing restricted trees was greater than the average yield for bearing control trees. It should be noted that, in each of the plantings, the tree with highest fruit count was plated, and not a control, in spite of the strong preponderance of control trees.

The device of FIG. 18A, having an incomplete enclosure continuous through a plurality of gaps with slots, with lateral limits divergent in a centrifugal direction, is thus shown to be effective in induction of precocity and enhancement of yield of fruit.

The value of a stem as a source of lumber, fuel, paper or for other purposes is correlated closely with its mass. Earlier data in parent Application Ser. No. 1188, now U.S. Pat. No. 4,193,224, showed a greater diameter above than below the site of application of this method, but no control data were presented. The newer material from rubber, maple, and magnolia trees provides such data, affording evidence of an increased rate of acquisition of mass by a stem subjected to this method.

A rapid increase in height of a young plant has been shown to be of survival value, as with greater height it competes better for sunlight with other plants nearby that might shade it. The newer data provide evidence for a more rapid acquisition of height by a stem subjected to the method of this invention than by controls. The lack of conformity between this and earlier findings of slow growth is probably due to the heavy growth of fruit on the more slowly erupting stem, with the fruit functioning as a sump, to deprive the stem of some of the available carbohydrate. No fruit competed for carbohydrate on the rubber, maple, or magnolia stems.

Obviously, many other modifications and variations of the present invention are made possible in light of the above teachings. It is therefore to be understood that within the scope of the appended claims, the invention may be practiced otherwise than as specifically described.

What is claimed is:

1. A method for control of translocation in a stem by restriction of growth comprising, maintaining a linear segment transversely at the surface of said stem at each of a plurality of levels, each said segment subtending an angle of not more than 180° about the axis of said stem, said linear segments being so positioned about the said axis as to form together an incomplete enclosure extending beyond one level, said enclosure being incomplete by virtue of there being a plurality of gaps or breaks in its limits, the number of said gaps corresponding to the number of said linear segments, so that said restriction of growth occurs at each said level by the said linear segment thereat, said growth extending thereafter through said gaps.

2. A method for control of translocation in a stem by restriction of growth comprising, containing said stem within an incomplete enclosure extending beyond one level, the limits of said incomplete enclosure being formed by at least one linear segment, said enclosure being incomplete by virtue of there being at least one gap or break in said limits, said enclosure extending beyond one level by virtue of said linear segment lying transverse to channels for translocation in said stem but not being confined to one plane at right angles to the axis of said stem, so that growth of said stem will be restricted at the said limits in a pattern extending beyond one level, and will extend through said gap.

3. A method for control of translocation in a stem by restriction of growth comprising, confining said stem closely within an incomplete enclosure at each level of a plurality of levels, said enclosure being incomplete by virtue of there being at least one gap or break in its limits, said incomplete enclosure being limited by at least one linear segment of material impervious to growth and resistant to the pressure of growth and maintained about said stem in a position transverse to channels for translocation, so that at each of said levels growth is restricted in a major portion of the sectors about the axis of said stem but growing tissue at all times is continuous with and extends without interruption between the portion of said stem above and the portion of said stem below the site of restriction in a pattern determined by the position of said linear segment, so that at each said level growth of said stem will be restricted at the limits of said incomplete enclosure thereat and will extend through said gap.

4. A method for control of translocation in a stem by restriction of growth comprising, maintaining a linear segment transversely at the surface of said stem at each of a plurality of levels, each said segment subtending an angle of not more than 180° about the axis of said stem, said linear segments being so positioned about the said axis as to form together the limits of an incomplete enclosure extending beyond one level, said enclosure being incomplete by virtue of there being a plurality of gaps or breaks in said limits, the number of gaps corresponding to the number of said linear segments, said incomplete enclosure being continuous through at least one gap with a slot, so that restriction of growth of said stem occurs at each level of said plurality of levels by the said linear segment thereat, said growth thereafter extending through said gaps, to be restricted at the lateral limits of any said slot.

5. A method for control of translocation in a stem by restriction of growth comprising, confining said stem within an incomplete enclosure extending beyond one level, the limits of said enclosure being formed by at least one linear segment, said enclosure being incomplete by virtue of there being at least one gap or break in the said limits, said enclosure extending beyond one level by virtue of said linear segment being positioned transverse to channels for translocation but not being confined to a plane at right angles to the axis of said stem, said incomplete enclosure being continuous through said gap with a slot, so that growth of said stem will be restricted at said limits of said enclosure in a pattern extending beyond one level and will extend through said gap, to be restricted thereafter at the lateral limits of said slot.

6. A method for control of translocation in a stem by restriction of growth comprising, confining said stem closely with an incomplete enclosure at each level of a plurality of levels, said enclosure being incomplete by virtue of there being at least one gap or break for growth in its limits, said incomplete enclosure being limited by at least one linear segment of material impervious to growth and resistant to the pressure of growth and maintained about said stem in a position transverse to channels for translocation, said enclosure at one of said levels, at least, being continuous through at least one said gap with a slot extending away from said enclosure, so that at each of said levels growth is restricted in a major portion of the sectors about the axis of said stem but growing tissue at all times is continuous with and extends without interruption between the portion of said stem above and the portion of said stem below the site of restriction in a pattern determined by the positioning of said linear segment, so that at each said level growth of said will be restricted at the limits of said incomplete enclosure related thereto by the respective linear segment and will extend through said gap, to be limited thereafter at the lateral limits of any slot.

7. A method for control of translocation in a stem by restriction of growth comprising, containing said stem closely within an incomplete enclosure limited by one linear segment subtending less than 360° about the axis of said stem, there being one gap for growth in the limits of said enclosure, so that growth of said stem will be restricted at the limits of said incomplete enclosure by said linear segment and will extend through said gap.

8. A method for control of translocation in a stem by restriction of growth comprising, containing said stem closely within an incomplete enclosure limited by one linear segment subtending less than 360° about the axis of said stem, there being one gap for growth in the limits of said enclosure, said linear segment being a flexible strand of material of adequate tensile strength to resist the pressure of growth and extending at the surface of said stem between two points of fixation, so that growth of said stem will fill said enclosure, thereby putting said flexible strand under tension and being restricted thereby and thereat, and will extend through said gap.

9. A method for control of translocation in a stem by restriction of growth comprising, containing said stem closely within an incomplete enclosure extending beyond one level and limited by one linear segment subtending less than 360° about the axis of said stem, there being one gap for growth in the limits of said incomplete enclosure, said incomplete enclosure extending beyond one level by virtue of said linear segment being so positioned as to lie transverse to channels for translocation but not confined to one plane at right angles to the axis of said stem, so that growth of said stem will be restricted in a pattern not confined to one level, but in a pattern extending therefrom, by said linear segment, and will extend through said gap.

10. A method for control of translocation in a stem by restriction of growth comprising, containing said stem closely within an incomplete enclosure extending beyond one level and limited by one linear segment subtending less than 360° about the axis of said stem, there being one gap for growth in the limits of said enclosure, said linear segment being a flexible strand of material of adequate tensile strangth to resist the pressure of growth and extending at the surface of said stem between two points of fixation, each said point being at a different level on said stem from the other said point, said linear segment being thereby so positioned as to lie transverse to channels for translocation but not confined to a plane at right angles to the axis of said stem, so that growth of said stem will, in filling said incomplete enclosure, put said strand under tension and be restricted thereby and thereat, in a pattern not confined to one level, but extending therefrom, by said flexible strand constituting said linear segment, and will extend through said gap.

11. A method for control of translocation in a stem by restriction of growth comprising, containing said stem within an incomplete enclosure extending beyond one level and limited by a linear segment subtending at least 360° about the axis of said stem, there being one gap for growth in the limits of said enclosure, said gap extending along the shortest course at the surface of said stem between two points, each said point being at an extremity of said linear segment, said points being at different levels on said stem, said gap being free of any portion of said linear segment, so that growth of said stem will be restricted at the limits of said incomplete enclosure in a pattern extending beyond one level, and will extend through said gap.

12. A method for control of translocation in a stem by restriction of growth comprising, containing said stem within an incomplete enclosure extending beyond one level and limited by a linear segment subtending at least 360° about the axis of said stem, there being one gap for growth in the limits of said enclosure, said linear segment being a flexible strand of material of adequate tensile strength to resist the pressure of growth and extending at the surface of said stem between two points of fixation, each said point being at an extremity of said linear segment, said points being at different levels on said stem, said gap extending along the shortest course at the surface of said stem between the two said points and being free of any portion of said linear segment, so that growth of said stem will fill said incomplete enclosure and put said flexible strand under tension and be restricted thereby and thereat in a pattern extending beyond one level, and will extend thereafter through said gap.

13. A method for control of translocation in a stem by restriction of growth comprising, containing said stem closely within an incomplete enclosure limited by one linear segment subtending less than 360° about the axis of said stem, there being one gap for growth in the limits of said enclosure, said incomplete enclosure being continuous through said gap with a slot extending away from said enclosure, so that growth of said stem will be restricted at the limits of said incomplete enclosure by said linear segment and will extend through said gap into said slot, to be restricted at the lateral limits of said slot thereafter.

14. A method for control of translocation in a stem by restriction of growth comprising, containing said stem closely within an incomplete enclosure limited by one linear segment subtending less than 360° about the axis of said stem, there being one gap for growth in the limits of said enclosure, said incomplete enclosure being continuous through said gap with a slot extending away from said enclosure, said linear segment being a flexible strand of material of adequate tensile strength to resist the pressure of growth and extending at the surface of said stem between two points of fixation, so that growth of said stem will fill said enclosure thereby putting said flexible strand under tension, and be restricted thereby and thereat, and will extend through said gap into said slot, to be restricted at the lateral limits of said slot thereafter.

15. A method for control of translocation in a stem by restriction of growth comprising, containing said stem closely within an incomplete enclosure extending beyond one level and limited by one linear segment subtending less than 360° about the axis of said stem, there being a gap for growth in the limits of said enclosure, said incomplete enclosure being continuous through said gap with a slot extending away from said enclosure, said incomplete enclosure extending beyond one level by virtue of the said linear segment being so positioned as to lie transverse to channels for translocation but not being confined to a plane at right angles to the axis of said stem, so that growth of said stem will be restricted in a pattern not confined to one level, but extending therefrom, by said linear segment, and will extend through said gap into said slot to be restricted at the lateral limits of said slot thereafter.

16. A method for control of translocation in a stem by restriction of growth comprising, containing said stem closely within an incomplete enclosure extending beyond one level and limited by one linear segment subtending less than 360° about the axis of said stem, there being a gap for growth in the limits of said enclosure, said incomplete enclosure being continuous through said gap with a slot extending away from said enclosure, said linear segment being a flexible strand of material of adequate tensile strength to resist the pressure of growth and extending at the surface of said stem between two points of fixation, said incomplete enclosure extending beyond one level by virtue of the said linear segment being so positioned as to lie transverse to channels for translocation but not being confined to a plane at right angles to the axis of said stem, so that growth of said stem will, in filling said incomplete enclosure, put said strand under tension and be restricted thereby and thereat, in a pattern not confined to one level but extending therefrom, by said flexible strand constituting said linear segment, and will extend through said gap into said slot to be restricted at the lateral limits of said slot thereafter.

17. A method for control of translocation in a stem by restriction of growth comprising, containing said stem within an incomplete enclosure extending beyond one level and limited by a linear segment subtending at least 360° about the axis of said stem, there being a gap for growth in the limits of said enclosure being continuous through said gap with a slot extending away from said enclosure, said gap extending along the shortest course at the surface of said stem between two points, each said point being at an extremity of said linear segment, said points being at different levels on said stem, said gap being free of any portion of said linear segment, so that growth of said stem will be restricted at the limits of said incomplete enclosure in a pattern extending beyond one level, but will extend through said gap into said slot to be restricted at the lateral limits of said slot thereafter.

18. A method for control of translocation in a stem by restriction of growth comprising, containing said stem within an incomplete enclosure extending beyond one level and limited by a linear segment subtending at least 360° about the axis of said stem, there being a gap for growth in the limits of said enclosure, said incomplete enclosure being continuous through said gap with a slot extending away from said enclosure, said linear segment being a flexible strand of material of adequate tensile strength to resist the pressure of growth and extending along the shortest course at the surface of said stem between two points of fixation, said points being at different levels on said stem, said gap being free of any portion of said linear segment, so that growth of said stem will fill said incomplete enclosure and put said flexible strand under tension and be restricted thereby and thereat in a pattern extending beyond one level, and will extend through said gap into said slot to be restricted at the lateral limits of said slot thereafter.

19. A method for effecting rapidity of onset of action and economy of production for a linear segment limiting an incomplete enclosure for restriction of growth to control translocation, said linear segment subtending less than 360° about the axis of a related stem, comprising, maintaining one of the two extremities of a strand of material, of adequate tensile strength to resist the pressure of growth, at each of two points on the surface of said stem, so that said strand extends under tension between the two said points transverse to channels for translocation, growth thereafter being restricted by said strand.

20. A method for control of translocation in a stem comprising, containing said stem closely within an incomplete enclosure for a predetermined interval of time, said enclosure being incomplete by virtue of there being at least one gap or break in its limits, so that growth of said stem will be restricted at the limits of said incomplete enclosure for a predetermined interval of time, but will not be restricted at said gap, and may extend therethrough, with removal of said incomplete enclosure after said predetermined interval of time, to allow for resumption of more nearly normal translocation past said level.

21. A method for fixing at a selected position on the surface of a stem each of the two extremities of a linear segment under tension for restricting growth to control translocation comprising, passing a strand of adequate tensile strength through a channel beneath the surface of said stem, said channel extending between two perforations in the said surface, and uniting the two extremities of said strand by twisting or knotting or other means for forming a continuous loop or ring thereof, one portion of said loop occupying said channel and the remainder of said loop lying along the surface of said stem to provide said linear segment, the extremities of said linear segment being fixed thereby at said perforation.

22. A method for control of translocation in a stem comprising, containing said stem within an incomplete enclosure at each of two levels, the incomplete enclosures being so arranged that at least one sector about the axis of said stem subtended by a gap at one of said levels includes a portion of a linear segment limiting the said enclosure at the other said level, so that in said sector translocation parallel to the axis of said stem through said gap is not impeded, but translocation past the other said level is impeded as a result of restriction of growth by the said linear segment lying thereat within said sector.

23. A method for control of translocation in a stem comprising, containing said stem within an incomplete enclosure at a selected level, there being at least one gap in said incomplete enclosure, said gap subtending a sector about the axis of said stem, said sector including at least a portion of a linear segment for restriction of growth significantly displaced from said gap along the axis of said stem at another level so that translocation in said sector occurs relatively freely through said gap, but is impeded because of and at the site of said restriction of growth.

24. A system for restriction of growth of a stem to control translocation comprising, a structure of plate-like material mounted on said stem and having a channel extending into the interior of said structure to provide the limits of a slot for growth, there being means for attachment of a strand for flexible material of adequate tensile strength to resist the pressure of growth nearthe extremity of each side of said slot away from the site of deepest extension into said structure, and at least one said strand to extend between said means under tension at the surface of said stem to form the limits of an incomplete enclosure for restriction of growth.

25. A system restricting growth of a stem to control translocation comprising, two lengths or posts of stiff rod-like material mounted on said stem to form the limits of a slot for growth extending away from said stem, one extremity of each said length being fashioned to penetrate said stem, the other two extremities of said lengths being bound in constant spatial relationship to one another by a stout arch or yoke, and at least one strand of flexible material of adequate tensile strength to resist the pressure of growth to extend under tension from one said length to the other at the surface of said stem as a linear segment forming the limits of an incomplete enclosure for restriction of growth.

26. A system for restricting growth in a stem to control translocation comprising, two lengths or posts of stiff rod-like material each mounted on said stem to form a limit of a slot for growth extending away from said stem, one extremity of each said length being fashioned to penetrate said stem, and at least one strand of flexible material of adequate tensile strength to resist the pressure of growth to extend under tension from one said length to the other at the surface of said stem as a linear segment contributing to the limits of an incomplete enclosure for restriction of growth, said incomplete enclosure being continuous through a gap at each said post at the surface of said stem with said slot, so that growth of said stem will, after taking up any slack in said strand, be limited thereby and will extend through said gap into said slot.

27. A system for restriction of growth of a stem comprising, a plate on the stem and having a central opening containing said stem, the limits of said central opening being the material of said plate and being interrupted by a plurality of gaps, or breaks, through each of which said gaps said central opening is continuous with a slot extending away from said central opening and limited on each of its respective sides by a linear segment of plate material, so that growth of a stem contained within said central opening will fill said opening and be restricted at the said limits thereof and will extend through said gaps to be restricted at the lateral limits of the slots related thereto.

28. A method for restricting growth of a stem comprising, containing said stem within an incomplete enclosure, said enclosure being incomplete by virtue of there being a plurality of gaps in its limits, said limits being a plurality of linear segments of material impervious to growth and resistant to the pressure of growth and equal in number to the number of said gaps, and positioned closely about said stem, so that growth of said stem will fill said incomplete enclosure and be restricted at the said limits and will extend through the said gaps.

29. The method according to claim 28, wherein, the linear segments constituting the limits of said incomplete enclosure are edges of plate-like material.

30. The method according to claim 28 wherein, the linear segments constituting the limits of said incomplete enclosure are formed by strands of considerable tensile strength.

31. A method for restriction of growth in a stem for control of translocation comprising, containing said stem within an incomplete enclosure, said enclosure being incomplete by virtue of there being a plurality of gaps, or breaks, in its limits through at least one of which gaps said incomplete enclosure is continuous with a slot, said limits being formed by a plurality of linear segments maintained closely about said stem and being of material impervious to growth and resistant to the pressure of growth, said slot extending outward from said incomplete enclosure and said stem, and being limited on each of its respective sides by a linear segment of material similarly impervious and resistant, so that growth of said stem will be restricted at the limits of said incomplete enclosure and will extend through said gaps and be restricted at the lateral limits of said slot.

32. The method according to claim 31 wherein, said linear segments are edges of plate-like material.

33. The method according to claim 31 wherein, the said linear segments are strands of material of considerable tensile strength.

34. A method for increasing the rate of acquisition of mass by a growing stem comprising, containing said stem within an incomplete enclosure, said enclosure being incomplete by virtue of there being at least one gap for growth in its limits, said limits being at least one linear segment of material impervious and resistant to the pressure of growth, and positioned closely about said stem so that growth of said stem will be restricted at the said limits and extend through said gap, translocation in the bark of said stem thereby being impeded with resultant increase in said rate.

35. A method for increasing the rate of acquistion of mass by a growing stem comprising, confining said stem within an incomplete enclosure said enclosure being incomplete by virtue of there being at least one gap for growth within its limits, through which said gap said enclosure is continuous with a slot for growth, the limits of said enclosure being at least one linear segment of material impervious and resistant to the pressure of growth and positioned closely about said stem, so that growth of said stem will be restricted at the limits of said incomplete enclosure and will extend through said gap into said slot to be restricted at the lateral limits thereof, translocation in the bark of said stem thereby being impeded with resultant increase in said rate.

36. A method for increasing the rate of acquisition of mass by a growing stem by restriction of growth of bark of said stem comprising, maintaining at the surface of said stem at least one linear segment of material impervious to and resistant to the pressure of growth, said linear segment being so disposed as to lie transverse to channels for translocation in a major portion of the sectors about the axis of said stem, there being, however, continuity of unrestricted bark between the levels of said stem above and the levels below the said restriction, so that downward translocation, past the site of said restriction is, although persistant to a minor degree, considerably reduced, with resultant accumulation of carbohydrates above the said site, available for utilization in the metabolic processes of said stem.

37. A method for increasing the rate of acquisition of length by a growing stem comprising, containing said stem within an incomplete enclosure, said enclosure being incomplete by virtue of there being at least one gap for growth within its limits, said limits being at least one linear segment of material impervious and resistant to the pressure of growth and positioned closely about said stem, so that growth of said stem will be restricted at the said limits and extend through the said gap, translocation in the bark of said stem being thereby impeded with resultant increase in said rate.

38. A method for increasing the rate of acquisition of length by a growing stem comprising, confining said stem within an incomplete enclosure, said enclosure being incomplete by virtue of there being at least one gap for growth within its limits, through which said gap said enclosure is continuous with a slot extending away from said enclosure, the limits of said enclosure being at least one linear segment of material impervious and resistant to the pressure of growth and positioned closely about said stem, so that growth of said stem will be restricted at said limits and will extend through said gap into said slot, to be restricted at the lateral limits thereof, translocation in the bark of said stem being thereby impeded, with resultant increase in said rate.

39. A method for increasing the rate of acquisition of length by a growing stem by restriction of growth of bark on said stem comprising, maintaining at the surface of said stem at least one linear segment of material impervious to and resistant to the pressure of growth, said linear segment being so disposed as to lie transverse to channels for translocation in a major portion of the sectors about the axis of said stem, there being, however, continuity of unrestricted bark between the levels of said stem above and the levels below the said restriction so that downward translocation past the site of said restriction is, although persistant to a minor degree, considerably reduced, with resultant accumulation of carbohydrate above the said site, available for utilization in the metabolic processes of said stem.

40. A method for providing a controlled increase in translocation to accommodate the increasing demands of a growing stem whose growth is restricted by containment within an incomplete enclosure, said enclosure being incomplete by virtue of there being at least one gap in the limits of said incomplete enclosure, comprising providing a slot for growth continuous through said gap with said incomplete enclosure, the limits of said slot at each of its two sides being a linear segment of material impervious to and resistant to the pressure of growth, said linear segment being divergent in a centrifugal direction with reference to the axis of said stem, so that said slot is progressively wider at progressively greater distances from said axis, so that growth of said stem, after filling said incomplete enclosure and extending through said gap, will be restricted at the said limits of said slot, providing for a controlled increase in translocation through said slot.

41. A system for providing a controlled increase in translocation to accommodate the increasing demand of a growing stem whose growth is restricted by containment within an incomplete enclosure, said enclosure being incomplete by virtue of there being at least one gap in the limits of said enclosure, comprising two linear segments of material impervious to and resistant to the pressure of growth being attached to the stem and so arranged as to form the lateral limits of a slot for growth, said slot being continuous through said gap with said incomplete enclosure, said linear segments being divergent in a centrifugal direction with reference to the axis of said stem so that said slot is progressively wider at progressively greater distances from said axis, so that growth of said stem, after filling said incomplete enclosure and extending through said gap, will be restricted at the said limits of said slot, providing for a controlled increase in translocation through said slot.

42. A system for restriction of growth of a stem for control of translocation, comprising a linear segment of material impervious to growth and resistant to the pressure of growth being attached to the stem and so arranged as to provide the limits of an incomplete enclosure containing said stem, said enclosure being incomplete by virtue of there being a gap or break in the said limits, said gap extending between the extremities of said linear segment, so that growth of said stem will be restricted by said linear segment and will extend through said gap.

43. The system as in claim 42, wherein said linear segment is a flexible strand of predetermined tensile strength.

44. A system for restriction of growth of a stem for control of translocation, comprising a linear segment of material impervious to and resistant to the pressure of growth being attached to the stem and so arranged as to form the limits of an incomplete enclosure for containing said stem, and two linear segments similarly impervious and resistant and so arranged relative to said first-mentioned segment as to form the lateral limits of a slot for growth, said enclosure being incomplete by virtue of a gap or break in the limits of said enclosure, said gap lying between the extremities of said linear segment, through which said gap said incomplete enclosure is continuous with said slot, so that growth of said stem will be restricted at the limits of said enclosure and will extend through said gap into said slot to be restricted thereafter at said limits.

45. The system as in claim 44, wherein said linear segment forming the limits of said incomplete enclosure is a strand of predetermined tensile strength.

46. A system for restriction of growth of a stem for control of translocation, comprising a plurality of first linear segments impervious to and resistant to the pressure of growth being attached to the stem and so arranged as to form the limits of an incomplete enclosure containing said stem, and a plurality of second related pairs of linear segments similarly impervious and resistant and so arranged relative to said first segments so as to form the lateral limits of a plurality of slots for growth, said enclosure being incomplete by virtue of a plurality of gaps or breaks in the limits of said enclosure through each of which said gaps said incomplete enclosure is continuous with one of said slots, said gaps and said slots corresponding in number, so that growth of said stem will be restricted at the limits of said incomplete enclosure and will extend through said gaps into said slots to be restricted thereafter at said lateral limits.

47. The system as in claim 46, wherein said linear segments forming the limits of said incomplete enclosures are strands of predetermined tensile strength.

48. A system for restriction of growth of a stem for control of translocation, comprising a plurality of linear segments of material impervious to and resistant to the pressure of growth, being attached to the stem and so arranged as to provide the limits of an incomplete enclosure containing said stem, said linear segments being flexible strands of predetermined tensile strength, said enclosure being incomplete by virtue by virtue of there being a corresponding plurality of gaps or breaks in said limits, said gaps extending between adjacent extremities of said linear segments, so that growth of said stem will be restricted by said linear segments and will extend through said gaps.

* * * * *